Jan. 27, 1931.  P. N. PETERS  1,790,169
SHOCK ABSORBER
Filed April 5, 1928  2 Sheets-Sheet 1
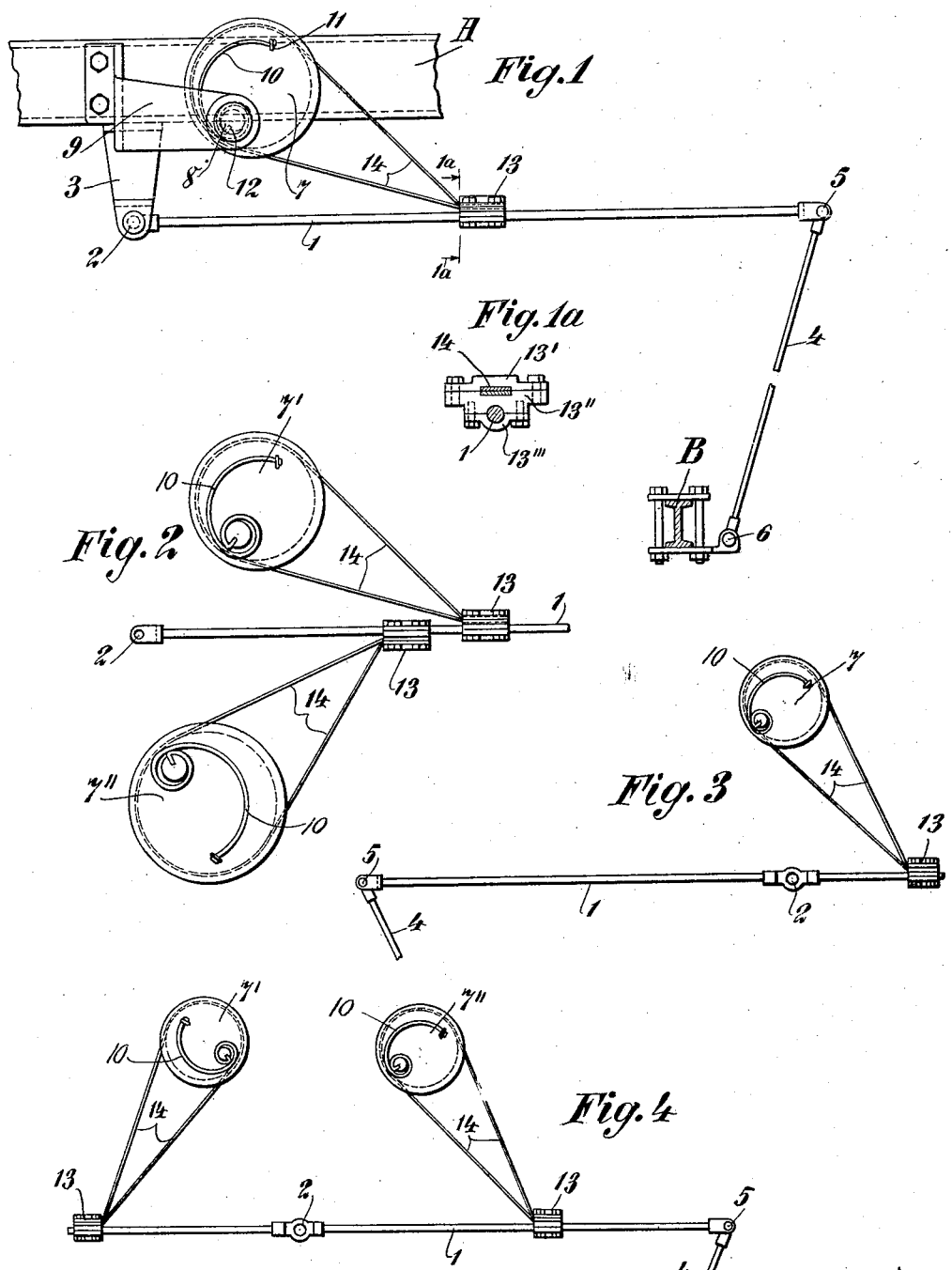

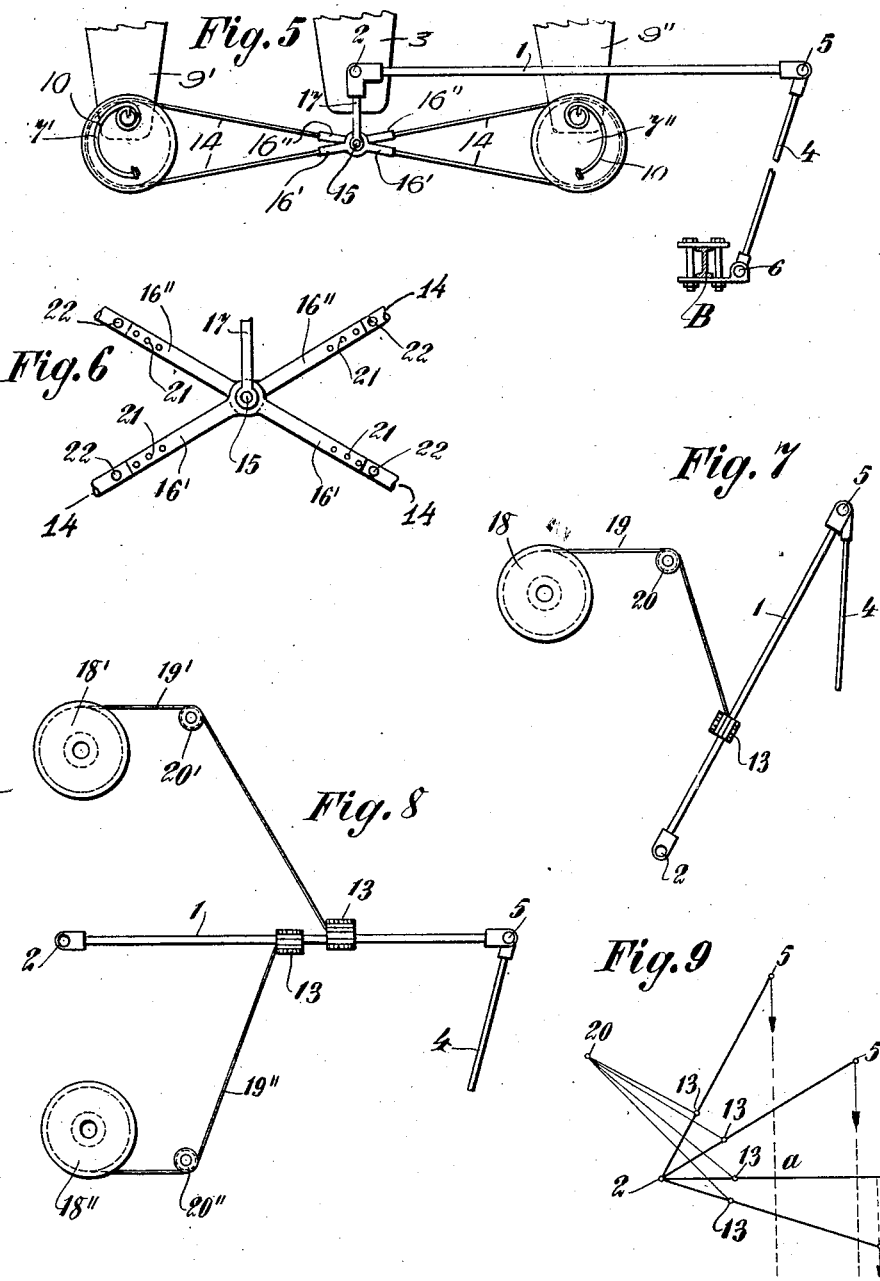

Patented Jan. 27, 1931

1,790,169

UNITED STATES PATENT OFFICE

PETER NICHOLAS PETERS, OF BROOKLYN, NEW YORK

SHOCK ABSORBER

Application filed April 5, 1928. Serial No. 267,560.

My invention relates to devices for controlling the relative motion of two bodies and, more particularly, to the class of such devices known as snubbers or shock absorbers.

One of the purposes of the invention is to increase the limits of the relative motion between the two bodies within which any snubber or shock absorber, whether of the type disclosed in my prior Patent No. 1,787,282, or of any other type, is operative.

Another object is to modify the character of the snubbing action in existing devices of this nature and, in particular, to create an action which is maximum at the start, decreases to a minimum at the so called "free center" position, and thereupon increases again to the end of the action, these being the characteristics uniformly acknowledged as the best in the case of motor vehicles, to which the present invention is especially well adapted.

Still another object is to intensify the aforesaid characteristics in the type of snubber disclosed in my above mentioned Patent No. 1,787,282, which already possesses them to a certain extent.

It is also an object of the present invention to apply the principles set forth and utilized in the aforesaid patent, which is concerned only with the so called "one way" shock absorbers, to "two way" shock absorbers, as well as to extend the method of changing the "one way" type into the "two way" type to snubbers and shock absorbers other than the one disclosed in the aforesaid patent.

A further object of the present invention is to vary the range of operation of the device disclosed in my Patent No. 1,787,282, wherein a cam shaped drum rotates within certain limits, by the introduction of a pivoted lever whose angular displacement is either added to or subtracted from the angular displacement of the cam shaped drum in determining the range of operation of the device.

Other objects of the invention will become apparent from the detailed description which follows.

In the drawings, Figure 1 is a front elevation of a "one way" shock absorber of the type disclosed in my application Serial No. 258,316, and embodying the present invention; Figure 2 is a partial front elevation of a "two way" shock absorber in which two units similar to the one shown in Figure 1 are combined; Figure 3 is a partial front elevation of a modification of the device shown in Figure 1; Figure 4 is a similar view of a modification of the device shown in Figure 2; Figure 5 is a further modification of the two way shock absorber embodying the present invention; Figure 6 is an enlarged partial view of a device differing from the one shown in Figure 5 only in the means for connecting the two straps to the lever mechanism, it being understood that the omitted parts are identical with the corresponding parts of the device shown in Figure 5; Figures 7 and 8 are partial front elevations of devices embodying the present invention when applied to conventional types of drum and strap one way and two way shock absorbers respectively; Figure 9 is a diagram illustrating the operation of the device shown in Figure 7; and Figure 1a is a detail of the connection between the straps and the lever in Figure 1.

With particular reference to Figures 1 to 5 inclusive, 1 is a lever pivotally fulcrumed at 2 on a bracket 3 attached to the body of a spring suspended vehicle of which only a portion A is shown. To the lever 1 is pivotally linked at 5 one end of an arm 4. The other end of the arm 4 is pivotally linked at 6 to the wheel axle B of the vehicle. To the body portion A is secured a second bracket 9 on which is eccentrically pivoted at 8 a drum 7 of circular cross section. A coil spring 10 is anchored at one end, 11, in the drum 7, and, at the other end, 12, in the stationary axle or pivot 8. A flexible strap 14, in frictional contact with the drum 7, has both its ends secured to the lever 1, as, for instance, by means of a clamp 13. The clamp 13, as shown in Figure 1a, is composed of three parts, 13', 13'' and 13''', the first two of which serve to clamp the ends of the strap 14 together, while the parts 13'' and 13''' clamp the strap to the lever 1.

The drums in Figures 1 to 5 inclusive, and the manner of attaching them to the body portion A, being in every way similar, the body A, brackets 3 and 9, and the coil spring 10, are shown only in Figure 1. Where two drums are used, they are designated by the numerals 7′ and 7″ respectively.

In Figure 5, the lever mechanism is slightly modified, the ends of the straps 14 being connected not directly to the lever 1, but to an arm 17 which is at an angle to the lever 1 and rotatable therewith about the pivot 2. In this modification, the clamp 13 is preferably made free to rotate about the pin 15.

In Figure 6, the ends of the straps 14 are secured not to the end of the arm 17, as in Figure 5, but to the ends of two V shaped pull rods 16′ and 16″ which are jointly pivoted on the arm 17 at 15. It will be clear that a drawing together of the ends 16′, 16″, on one side of the arm 17 will be accompanied by a corresponding separation of the ends 16′, 16″, on the other side of the arm 17. Any means may be used to make the connection between the straps and the rods 16′ and 16″ adjustable. In the drawing, a series of perforations 21 are shown for the passage of rivets 22 or similar means securing the straps 14 to the pull rods, the connection being moved from one perforation to another as may be necessary, for instance, when it is desired to tighten the straps.

When two drums are used, they need not be of the same diameter. To make this clear, they are shown as of different diameter in at least one illustration, namely, in Figure 2. The two drums may be disposed on the same or on opposite sides of the lever 1, as shown in Figures 4 and 2, respectively. The strap ends of any one of the units shown may be secured to the lever between the points 2 and 5, as in Figure 1, or at a point situated on an extension of the lever in opposite direction from its fulcrum, as in Figure 3. The distances of the two clamps 13 from the point 2 may vary in all of the forms shown. One may be further away from the point 2 than the other, or equally distant therefrom. In the latter case, if the form is that shown in Figure 2, both straps would be clamped to the lever 1 at the same point. Likewise, the distance of a drum from the lever 1 may be varied. These and many other variations which would be obvious to men skilled in the are constitute factors which affect the character of operation of the snubber, without, however, departing from the general principles involved. The multiplicity of possible variations indicated above, to which should be added the variations in the relative sizes and disposition of parts of the snubber unit itself, i. e. irrespective of the lever mechanism, permits a vast selectivity in the matter of snubber characteristics.

In Figures 7 and 8, the drums 18, 18′ and 18″ are stationary and the straps 19, 19′ and 19″ wind and unwind on their respective drums in the well known manner of the conventional drum and strap type of shock absorber, in cooperation with a preloading spring (not shown). The straps are shown as passing over pulleys 20, 20′, 20″, connected to the body portion A (not shown), and secured to the lever 1 in a manner similar to that shown in the other figures.

In my Patent No. 1,787,282, I have shown a form of one way shock absorber or snubber comprising a rotatable cam mounted on the body of a spring suspended vehicle and connected to a wheel axle of this vehicle by a strap which is in frictional contact with the cam. Both ends of the strap are secured to the wheel axle. The force of recoil of the vehicle spring is applied to the cam at two points where it has opposite effects thereon, so that a differential torque is produced which causes the cam to rotate against the frictional resistance between the cam and the strap.

The device shown in Figure 1, with the exception of the lever mechanism, is identical with the one disclosed in my aforesaid patent. It is, of course, a simple matter to combine two such units in the same mechanism, one responsive to the compression of the vehicle spring, and a second one responsive to the recoil from this compression, thus obtaining a two way shock absorber, but such a direct combination of two units involves certain practical difficulties which it is desirable to avoid.

It is partly in order to avoid the aforesaid practical difficulties that the lever mechanism has been added to the device as originally conceived. Another reason for the introduction of the lever mechanism is that the range of operation of the units, whether used singly, or tandem, is increased thereby and made more adaptable to numerous and varied conditions arising in practice. Instead of securing the ends of the strap directly to the body B (wheel axle), as in the other patent above referred to, they are now secured to a point of a lever fulcrumed on one of the relatively movable bodies and linked to the other body. The separate units, i. e. the present device less the lever mechanism, are very fully described and discussed in my Patent No. 1,787,282, even as to their theory, and it is not deemed necessary to again discuss them here. The present invention is concerned mainly with the function of the lever as it affects the operation of each separate unit and with the manner of linking one unit to another.

The advantages derived from the introduction of the lever mechanism are not confined to the type of unit described in my other patent. They extend to all devices of similar nature. The lever mechanism is of especial value in all snubbers of the drum and strap type, not only because of the extended range of operation, but because of the changed character of this operation. To illustrate these advantages when the invention is applied to the shock absorber of the conventional drum and strap type for use on spring suspended vehicles, let us consider the device shown in Figure 7. The force of recoil is transmitted to the lever 1 through the link 4 and is directed downwards. The diagram, Figure 9, illustrates the action during the recoil movement. The points 2 and 20 are stationary (relatively to the vehicle body, A). As the recoil proceeds, the point 5 assumes the successive positions indicated in the diagram, passing from the uppermost position (start of the recoil) to the nethermost (end of the recoil), the point 13 following suit. The succession of lines 20—13 indicates the corresponding positions of the strap 19 between the roller 20 and the connection 13.

The force of the recoil applied at the point 5 is indicated by the arrows. It will be seen from the diagram that, assuming this force to be constant, it will produce a torque about the point 2 which is maximum when the line 2—5 is horizontal, i. e. when the vehicle spring is under normal tension (neither expanded, nor compressed), corresponding to what is termed the "free center" position; and that this torque increases from the start of the recoil (uppermost position of the point 5) until it reaches its maximum value at the free center position, and thereupon decreases until the end of the recoil is reached (nethermost position of the point 5). It follows that, as compared with the performance of the conventional snubber of this type, the snubbing action will be increased at the start, diminished at the free center, and increased again as the free center position is passed.

These results are somewhat modified by the fact that the force of the recoil is not constant but gradually diminishes as the movement of recoil proceeds, i. e. as the point 5 moves downward. However, the above described characteristics will still prevail if the lever arm 1 has the proper inclination at the start of the recoil, so that the increase in the torque on the downward movement of the point 5 from the uppermost position to the free center position overbalances the decrease of the force itself. For instance, if the distance 2—a is one quarter of the distance 2—5, and the force of recoil at the free center is one half the force at the start of the recoil movement, the torque being the product of the force by its distance from the point 2, it will be twice as great at the free center as at the start of the recoil movement.

It may be added that, since both, the force of recoil and the distance of this force from the point 2, decrease below the free center position, the torque will decrease very rapidly after this position is passed, i. e. the snubbing action will rapidly increase, which is one of the conditions desired in the application of such devices to spring suspended motor vehicles in particular.

As to the operation of the device illustrated in Figure 1, it is briefly this:

On compression of the vehicle spring, i. e. when the axle B moves upward, the strap 14 slackens its hold on the drum 7, whereupon the coil spring 10 acts to turn the drum counter clockwise, which action automatically takes up the slack in the strap. On recoil, i. e. when the axle B moves downward, a pull is transmitted to the drum through both ends of the strap 14, resulting in a differential torque which causes the drum to rotate clockwise against the frictional resistance between the drum and the strap. This operation is fully explained in my Patent No. 1,787,282, wherein, among other details, a formula is given for the value of the differential torque. The only difference between the operations in the two cases is that the force of recoil now acts on the snubber unit through the medium of the lever mechanism. The amplitude of oscillation of the point 13 is much smaller than the amplitude of oscillation of the point 6 (at the vehicle spring), so that, as compared with the snubber unit acting directly on the axle B in accordance with the specification in the above referred to patent, the present device is operative for a much wider range of amplitudes of oscillation of the vehicle spring and, in its broader application, to a wider range of relative motion between two bodies.

The character of the snubbing action is not changed by the addition of the lever mechanism to the device disclosed in the Patent No. 1,787,282. Like this other device, the present one possesses the feature of the snubbing effect which is maximum, at the start of the recoil, decreasing towards the free center position, and again increasing after the free center position is passed, but, in the present device, these characteristics are intensified because of the larger total angle of rotation of the drum due to the effect of the swinging motion of the lever 1 about the point 2.

An increased range of relative movement between the bodies A and B within which the device is operative presupposes that the point 13 is nearer to the point 2 than the point 5. However, I do not limit myself to this arrangement, as the device is equally applicable in cases where the reverse condition is imposed, i. e., where the distance of the point 13 from the point 2 is greater than the distance of the point 5 therefrom. Likewise, the points 13 and 5 may be made to coincide. Also, it is not necessary that the point 13 be on the same side as the point 5 with respect to the fulcrum point 2, the opposite arrangement being shown in Figure 3.

To obtain a two way shock absorber with a device such as is disclosed in my Patent No. 1,787,282, I may combine two units in the manner shown in Figures 2 or 4. One unit is operative when the relative motion between the bodies A and B is in one direction, and the other unit when this motion is in opposite direction. In the case of a spring suspended vehicle, one unit operates during the compression period of the spring, and the other during the recoil period. It is clear that the strap of one unit will be taut while the strap of the other is slack, and vice versa. Usually, it is desired to make the snubbing action on compression different from that on recoil. As already stated above, a wide latitude for such differences is afforded by the possibility of varying the relative sizes and dispositions of the drums, the distances of the clamps 13 from the fulcrum 2 of the lever 1, and such other variations as are discussed in the Patent No. 1,787,282, as, for instance, changes in the eccentricity of the drums or in the lengths of the arcs of contact between the drums and the straps.

The specific arrangement shown in Figure 5 is designed for the case where it is desired to maintain the direction of pull on the drums. This is accomplished by making the arm 17 equal to the eccentricity of the drums. It will be readily seen that in this case the line joining the centers of the drums remains parallel to itself as the point 15 turns about the point 2.

The straps 14 may be attached to the ends of a couple of V shaped rods 16', 16" (Figure 6) which are jointly pivoted at 15 to one end of the arm 17. In this case, a pull on the right hand drum (not shown) will tend to draw the right hand ends 16', 16" of the two rods together, at the same time separating the opposite ends of these rods, with the result that the length of the arc of contact between the right hand drum and its strap will be increased, while the length of the arc of contact between the left hand drum (not shown) and its strap will correspondingly decrease. The effect of the latter action is to decrease the resistance due to friction between the slack strap and its drum, thus permitting the use of a lighter coil spring 10 to rotate the drum for the purpose of taking up the slack.

A great many modifications may be made in the device illustrated herein, without in any way departing from the underlying principle of operation, and it is to be understood that I do not mean to limit myself to the particular arrangements of the several parts entering into the complete structure of the device illustrated in the drawings. Thus, for instance, the lever mechanism need not be composed of the specific elements shown, such as the rod 1 and link 4, but may be of any other form which will sustain the same operative principle. It is mainly in order to emphasize this point that the arrangement of Figure 5, which includes the additional arm 17, has been shown. Clearly, many different linkages may be used in this connection which will accomplish substantially the same result, and the specific forms shown are intended merely as illustrations, selected not so much by preference as on account of their simplicity.

I claim:

1. In a snubbing mechanism for controlling relative motion of two bodies, a brake comprising a member carried by one of said bodies and a second member angularly displaceable relatively thereto, means for restraining the relative angular displacements of said brake members, a lever pivotally fulcrumed on the aforesaid body at a point other than the center of said relative angular displacements, means for transmitting a force from the other one of said bodies to said lever, and means connecting said lever with the terminals of said second brake member.

2. In a snubbing mechanism for controlling relative motion of two bodies, a brake comprising a member carried by one of said bodies and a second member angularly displaceable relatively thereto, means for frictionally restraining the angular displacements of said brake members relatively to one another, a lever pivotally fulcrumed on the aforesaid body at a point other than the center of said angular displacements, means connecting said lever to the other one of said bodies, and means connecting the terminals of said second brake member to said lever.

3. In a snubbing mechanism for controlling relative motion of two bodies, a brake comprising a member carried by one of said bodies and a flexible member angularly displaceable relatively thereto, means for restraining the relative angular displacements of said brake members, a lever pivotally fulcrumed on the aforesaid body at a point other than the center of said relative angular displacements, means connecting said lever to the other one of said bodies, and means securing the terminals of said flexible member to said lever.

4. A snubbing mechanism for controlling relative motion of two bodies comprising a drum carried by one of said bodies, a member cooperating with said drum restrainingly displaceable relatively thereto, a lever pivotally fulcrumed on the aforesaid body eccentrically to said drum and linked to the other one of said bodies, and means connecting the terminals of said restrainingly displaceable member to said lever.

5. A snubbing mechanism for controlling relative motion of two bodies comprising a drum carried by one of said bodies, a lever pivotally fulcrumed on the aforesaid body eccentrically to said drum, a flexible member in frictional contact with said drum, means securing the terminals of said flexible member to said lever, and means connecting said lever to the other one of said bodies.

6. A snubbing mechanism for controlling relative motion of two bodies comprising a drum carried by one of said bodies, a lever pivotally fulcrumed on the aforesaid body eccentrically to said drum, a flexible member in frictional contact with said drum, means connecting said lever to the other one of said bodies, and means securing the terminals of said flexible member to said lever at a point nearer to its fulcrum than the point of connection between said lever and said last mentioned body.

7. In a snubber for controlling relative motion of two bodies, a pair of brakes, each brake comprising a member carried by one of said bodies and a second member angularly displaceable relatively thereto, means for restraining the relative angular displacements of said brake members, a lever pivotally fulcrumed on the aforesaid body at a point other than the centers of said relative angular displacements, means connecting said lever to the other one of said bodies, and means connecting said second members of said brakes to said lever, one or the other of said second members being under restraint according as the relative motion of the two bodies is in one or in the opposite direction.

8. In a snubber for controlling relative motion of two bodies, a pair of brakes, each brake comprising a member carried by one of said bodies and a second member angularly displaceable relatively thereto, means for frictionally restraining the relative angular displacements of said brake members, a lever pivotally fulcrumed on the aforesaid body at a point other than the centers of said relative angular displacements, means connecting said lever to the other one of said bodies, and means securing said second members to said lever, one or the other of said brakes being operative according as the relative motion of said bodies is in one or in the opposite direction.

9. A snubbing mechanism for controlling the relative motion of two bodies comprising: a pair of drums carried by one of said bodies, a lever pivotally fulcrumed on the aforesaid body eccentrically to said drums, means connecting said lever to the other one of said bodies, and flexible members in frictional contact with said drums secured to said lever, one or the other of said flexible members being taut according as the relative motion of said bodies is in one or in the opposite direction.

10. A snubber for controlling the relative motion of two bodies comprising: a member movably mounted on one of said bodies, a lever pivotally fulcrumed on the aforesaid body, means for transmitting a force from the other one of said bodies to said lever, and connecting means to said member originating and terminating at said lever.

11. A snubber for controlling the relative motion of two bodies comprising: a member rotatably mounted on one of said bodies, a lever pivotally fulcrumed on the aforesaid body, means for transmitting a force from the other one of said bodies to said lever, and connecting means to said member originating and terminating at a point of said lever nearer to its fulcrum than the point at which said force is applied thereto.

12. A snubber for controlling the relative motion of two bodies comprising: a drum of circular cross section eccentrically pivoted on one of said bodies, a lever pivotally fulcrumed on the aforesaid body and connected to the other one of said bodies, and connecting means to said drum originating and terminating at said lever.

13. A snubber for controlling the relative motion of two bodies comprising: a cam shaped member rotatably mounted on one of said bodies, a lever pivotally fulcrumed on the aforesaid body and linked to the other one of said bodies, and connecting means originating and terminating at said lever adapted to frictionally grip said cam shaped member when the relative motion of said bodies is in one direction.

14. A snubber for controlling the relative motion of two bodies comprising: a pair cam shaped members rotatably mounted on one of said bodies, a lever pivotally fulcrumed on the aforesaid body and linked to the other one of said bodies, and connecting means originating and terminating at said lever adapted to grip said cam shaped members, the gripping action of said connecting means taking place with respect to one or the other of said cam shaped members according as the relative motion of said bodies is in one or in the opposite direction.

15. A snubber for controlling the relative motion of two bodies comprising: a pair of drums of circular cross section eccentrically pivoted on one of said bodies, a lever pivotally fulcrumed on the aforesaid body at a point other than the pivots of said drums, means connecting said lever to the other one of said bodies, and flexible members having their terminals on said lever adapted to frictionally grip said drums, one of the other of said flexible members gripping a drum according as the relative motion of said bodies is in one or in the opposite direction.

16. A snubber for controlling the relative motion of two bodies comprising: a pair of drums of circular cross section eccentrically pivoted on one of said bodies, a lever pivotally fulcrumed on the aforesaid body and linked to the other one of said bodies, flexible means connecting said drums to said lever, one or the other of said connecting means being taut according as the relative motion of said bodies is one or in the opposite direction, and means for taking up the slack of said connecting means.

17. In a snubber for controlling the relative motion of two bodies comprising a pair of drums pivoted on one of said bodies and flexible members in circumferential contact with said drums having their terminals secured at points operatively connected to the other one of said bodies, means for increasing the arc of contact between one of said flexible members and its corresponding drum while the arc of contact between the other flexible member and the other drum is decreased, and vice versa.

18. In a snubber for controlling the relative motion of two bodies comprising a lever pivotally fulcrumed on one of said bodies, a pair of cam shaped drums pivoted on the aforesaid body, and flexible members in peripheral contact with said cam shaped members, a pair of V shaped rods jointly pivoted at their vertices on said lever, and means connecting the terminals of each one of said flexible members to ends of different ones of said rods.

19. In a device such as is described in claim 18, means for adjusting the connections between the terminals of the flexible members and the V shaped rods.

20. A snubbing mechanism for controlling relative motion of two bodies comprising a cam shaped member rotatably mounted on one of said bodies, a second member angularly displaceable relatively to said cam shaped member, means for restraining the relative angular displacements of said two members, a lever pivotally fulcrumed on the aforesaid body at a point other than the center of said relative angular displacements, means for transmitting a force from the other one of said bodies to said lever, and means connecting said lever with the terminals of said second member.

21. A snubbing mechanism for controlling the relative motion of two bodies comprising a drum of circular cross section eccentrally pivoted on one of said bodies, a flexible member angularly displaceable relatively to said drum, means for restraining the relative angular displacements of said drum and flexible member, a lever pivotally fulcrumed on the aforesaid body at a point other than the center of said relative angular displacements, means for transmitting a force from the other one of said bodies to said lever, and means connecting said lever with the terminals of said flexible member.

PETER NICHOLAS PETERS.